United States Patent
Claezon et al.

(10) Patent No.: US 11,050,949 B2
(45) Date of Patent: Jun. 29, 2021

(54) METHOD AND CONTROL UNIT FOR A DIGITAL REAR VIEW MIRROR

(71) Applicant: Scania CV AB, Södertälje (SE)

(72) Inventors: Fredrich Claezon, Värmdö (SE); Mikael Lindberg, Huddinge (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 16/311,227

(22) PCT Filed: Jun. 12, 2017

(86) PCT No.: PCT/SE2017/050626
§ 371 (c)(1),
(2) Date: Dec. 19, 2018

(87) PCT Pub. No.: WO2018/004421
PCT Pub. Date: Jan. 4, 2018

(65) Prior Publication Data
US 2019/0191107 A1 Jun. 20, 2019

(30) Foreign Application Priority Data
Jun. 28, 2016 (SE) .................... 1650924-2

(51) Int. Cl.
*H04N 5/262* (2006.01)
*B60R 1/00* (2006.01)
(Continued)

(52) U.S. Cl.
CPC ............. *H04N 5/2628* (2013.01); *B60R 1/00* (2013.01); *G06K 9/00791* (2013.01); *H04N 7/18* (2013.01);
(Continued)

(58) Field of Classification Search
CPC ........ H04N 5/2628; H04N 7/18; H04N 7/183; H04N 5/23299; H04N 5/2257;
(Continued)

(56) References Cited

U.S. PATENT DOCUMENTS 5,289,321 A * 2/1994 Secor ..................... B60K 35/00
359/896
6,193,380 B1 2/2001 Jacobs
(Continued)

FOREIGN PATENT DOCUMENTS

| CN | 103935298 A | 7/2014 |
|----|-------------|--------|
| WO | 2014027147 A1 | 2/2014 |
| WO | 2014206406 A1 | 12/2014 |

OTHER PUBLICATIONS

International Preliminary Report on Patentability for International Application No. PCT/SE2017/050626 dated Jan. 1, 2019.
(Continued)

*Primary Examiner* — Dramos Kalapodas
(74) *Attorney, Agent, or Firm* — Moore & Van Allen PLLC; W. Kevin Ransom

(57) ABSTRACT

Method and control unit in a vehicle comprising a digital rear view mirror, for detecting an object situated outside a default view of a display of the digital rear view mirror and visualizing the detected object for a driver of the vehicle. The method comprises detecting the object, situated outside the default view of the display, by a sensor; and adjusting the field of view of a subset of the display by widening the viewing angle so that the object becomes visible for the driver in the subset of the display, while the main portion of the display outputs the default view at a default viewing angle.

4 Claims, 5 Drawing Sheets

(51) Int. Cl.
*H04N 7/18* (2006.01)
*G06K 9/00* (2006.01)
(52) U.S. Cl.
CPC .............. *H04N 7/181* (2013.01); *H04N 7/183* (2013.01); *B60R 2300/105* (2013.01); *B60R 2300/802* (2013.01)
(58) Field of Classification Search
CPC .... H04N 5/374; H04N 7/181; H04N 5/23238; H04N 13/0239; G06K 9/00791; G06K 9/00805; B60R 2300/105; B60R 2300/802; B60R 1/081; B60R 1/12; B60R 21/0134; B60R 2001/1215; B60R 2300/202; B60R 2300/70; B60R 2300/8093; B60R 1/08; B60R 2300/8066; B60R 2300/303; B60R 2300/8046; B60R 2300/8026; B60R 1/00; B60K 35/00; B60Y 2400/92
See application file for complete search history.

(56) References Cited

U.S. PATENT DOCUMENTS

| | | | |
|---|---|---|---|
| 6,885,968 B2* | 4/2005 | Breed | G01S 7/481 |
| | | | 702/143 |
| 8,564,422 B2* | 10/2013 | Schwartz | B60R 1/00 |
| | | | 340/435 |
| 9,096,175 B1 | 8/2015 | Harris | |
| 9,969,330 B2 | 5/2018 | Brandl et al. | |
| 2002/0005778 A1 | 1/2002 | Breed et al. | |
| 2005/0111117 A1 | 5/2005 | Qualich et al. | |
| 2006/0290482 A1 | 12/2006 | Matsumoto et al. | |
| 2009/0010567 A1 | 1/2009 | Akiba et al. | |
| 2009/0143967 A1* | 6/2009 | Lee | B60R 1/00 |
| | | | 701/119 |
| 2010/0020170 A1 | 1/2010 | Higgins-Luthman et al. | |
| 2010/0076683 A1* | 3/2010 | Chou | B60R 1/00 |
| | | | 701/301 |
| 2010/0097199 A1* | 4/2010 | Schwartz | B60R 1/00 |
| | | | 340/435 |
| 2011/0115913 A1 | 5/2011 | Lang et al. | |
| 2012/0062741 A1 | 3/2012 | Stimel, Jr. et al. | |
| 2012/0200664 A1* | 8/2012 | Lang | B60R 1/00 |
| | | | 348/36 |
| 2013/0038735 A1 | 2/2013 | Nishiguchi et al. | |
| 2014/0071278 A1 | 3/2014 | Assaf | |
| 2014/0114500 A1 | 4/2014 | Noh | |
| 2014/0114534 A1 | 4/2014 | Zhang et al. | |
| 2014/0327775 A1* | 11/2014 | Cho | H04N 5/23216 |
| | | | 348/148 |
| 2015/0251602 A1* | 9/2015 | Baur | B60R 1/00 |
| | | | 348/148 |
| 2015/0360614 A1* | 12/2015 | Frommann | H04N 7/181 |
| | | | 348/148 |
| 2016/0100084 A1* | 4/2016 | Schofield | B60R 1/06 |
| | | | 348/148 |
| 2016/0148062 A1* | 5/2016 | Fursich | G06K 9/00805 |
| | | | 348/36 |
| 2017/0349098 A1* | 12/2017 | Uhm | B60K 35/00 |
| 2018/0319336 A1* | 11/2018 | Wikstrom | B60Q 9/00 |
| 2019/0202355 A1* | 7/2019 | Tatara | B60R 1/06 |
| 2019/0248288 A1* | 8/2019 | Oba | G06T 3/0006 |
| 2020/0384917 A1* | 12/2020 | Wikstrom | B60R 1/00 |

OTHER PUBLICATIONS

International Search Report for International Application No. PCT/SE2017/050626 dated Aug. 25, 2017.
Written Opinion of the International Searching Authority for International Application No. PCT/SE2017/050626 dated Aug. 24, 2017.
Swedish Office Action for Swedish Patent Application No. 1650924-2 dated Feb. 6, 2017.
Scania CV AB, European Application No. 17820640.5, Extended European Search Report, dated Jan. 24, 2020.

\* cited by examiner

METHOD AND CONTROL UNIT FOR A DIGITAL REAR VIEW MIRROR

CROSS-REFERENCE TO RELATED APPLICATIONS

This application is a national stage application (filed under 35 § U.S.C. 371) of PCT/SE2017/050626, filed Jun. 12, 2017 of the same title, which, in turn, claims priority to Swedish Application No. 1650924-2 filed Jun. 28, 2016; the contents of each of which are hereby incorporated by reference.

FIELD OF THE INVENTION

This document relates to a method and a control unit in a vehicle. More particularly, a method and a control unit is described, for detecting and tracking an object situated in a blind spot of a rear view mirror of the vehicle.

BACKGROUND OF THE INVENTION

There are areas around a vehicle that are not visible for the driver, neither by direct vision nor indirectly with the help of a mirror. These areas are sometimes referred to as "blind spots" of the driver. The problems with visibility is in particular substantial in heavy vehicles such as trucks, and in particular for trucks with trailers.

The problem is escalated when the vehicle is turning. There is then a risk of an accident if the driver of the vehicle changes direction when an object is situated in such blind spot.

Various attempts have been made to solve this problem, e.g. by enlarging mirrors, by adding extra mirrors or by adding sensors, like e.g. cameras, covering the blind spots and generating a warning signal on a display or similar. Adding additional mirrors and/or sensors is however expensive. It is also difficult to install in a convenient way and present the information concerning coverage of the blind spot to the driver in a convenient manner. To iteratively trigger alerting signals just because another vehicle for the moment is not visible in the mirror may be perceived as disturbing and even distracting by the driver. Further, additional and/or larger vehicle external mirrors will add air resistance and thus also increase fuel consumption. Also the driver's direct visibility in the direction of the rear view mirrors will be further limited by the mirrors themselves.

Another known solution is to use wide-angle mirrors in addition to the standard rear view mirrors. Thereby blind spots around the vehicle may be at least partly covered, but unfortunately wide-angle mirrors affect the perspective, as perceived by the driver. Thereby objects situated close to the wide-angle mirror seems bigger/closer than they are in reality, while objects situated further away seems smaller/more distant than they are in reality. Such distorted view may confuse or disorientate the driver, which may lead to accidents due to inappropriate driver reactions on observed objects. Also, the driver has to check both mirrors, which takes time and may even present an ergonomic problem for the driver.

It is also known to replace a conventional rear view mirror of a vehicle with a pair of cameras (situated outside the vehicle) and a corresponding display (situated in the cabin). This arrangement may sometimes be referred to as a digital rear view mirror. An advantage is that air resistance may be reduced, as the camera is considerably smaller than a rear view mirror. However, the above discussed problems with blind spots around the vehicle are not solved only by making such replacement.

A problem that however appears when exchanging mirrors for cameras is that a digital rear view mirror has a fixed field of view which does not change when the driver changes the eye position. This leads to a situation where the driver is not able to keep track of another object passing the own vehicle by leaning forward/backwards, as is the case when using conventional mirrors. The camera will capture and display the same field of view independently of any driver movements and eye positions. Thereby a possibly dangerous situation is created when exchanging rear view mirrors with digital rear view mirrors.

The document US 20050111117 relates to automatic viewing of vehicle blind spot. A vehicle has rear view mirrors which may be redirected by a motor. A sensor may detect an object in a blind spot of the vehicle. The motor may then redirect the mirror to provide a view of the blind spot (with the detected object) to the driver.

A disadvantage with the disclosed solution is that it is based on conventional rear view mirrors, having the above mentioned disadvantages of high air resistance in comparison with a digital rear view mirror solution. Further, the direct view of the driver in the direction of each rear view mirror is affected. Another problem with changing the direction of the rear view mirror is that the driver may become uncertain of what is actually displayed in the mirror and where the object is positioned in relation to the own vehicle.

Yet a disadvantage is that when driving in dense traffic, the vehicle may be surrounded with several other vehicles, some within the field of view, some outside. When the mirror is redirected to capture the object in the blind spot, a new blind spot will emerge, that previously was covered by the mirror. However, in case the driver is not aware of that vehicle, the situation after having redirected the mirror may be as dangerous as before, but with another object in another blind spot.

Document U.S. Pat. No. 6,193,380 presents a solution similar to US 20050111117, but with an automatic return of the mirror to a default position when the object is no longer present in the vehicle blind spot.

This solution shares the same disadvantages as the previously discussed solution in document US 20050111117.

Document US 20140071278 describes a solution for blind-spot detection and collision avoidance where a blind-spot camera is located between a side-view mirror and the vehicle body. The rear view mirror has an integrated display that displays an indication of objects detected in blind spots. The camera may then follow the object as it is moving about the perimeter of the driver's vehicle.

Also this solution shares the above mentioned disadvantages of conventional vehicle external mirrors, but makes it easier for the driver to distinct between the normal view of the rear view mirror (which is reflected in the mirror) and the blind spot camera view (which is presented on the display).

It would thus be desired to improve digital rear view mirrors of vehicles in order to reduce problems associated with conventional rear view mirrors and blind spots and thereby enhance traffic safety by improving the visibility of the driver.

SUMMARY OF THE INVENTION

It is therefore an object of this invention to solve at least some of the above problems and improve traffic safety.

According to a first aspect of the invention, this objective is achieved by a method in a vehicle comprising a digital rear view mirror. The method aims at detecting an object situated in an extended field of view outside a default view of a display of the digital rear view mirror and visualizing the detected object for a driver of the vehicle. The method comprises detecting the object, situated outside the default view of the display, by a sensor. Further, the method also comprises adjusting the field of view of a subset of the display by widening the viewing angle to said extended field of view so that the object becomes visible for the driver in the subset of the display, while the main portion of the display outputs the default view at a default viewing angle. The step of adjusting the field of view of the subset is performed in case an object is detected. Said field of view of the subset of the display is adjusted to said extended field of view so that the extended field of view is displayed in the subset of the display. Said digital rear view mirror comprising at least one camera for capturing a stream of images and a display for displaying the captured stream of images.

According to a second aspect of the invention, this objective is achieved by a control unit in a vehicle comprising a digital rear view mirror. The control unit aims at detecting an object situated outside a default view of a display of the digital rear view mirror and visualizing the detected object for a driver of the vehicle. The control unit is configured to detect the object, situated outside a default view of the display, based on signals received from a sensor. Further the control unit is configured to generate control signals to adjust the field of view of a subset of the display by widening the viewing angle so that the object becomes visible for the driver in the subset of the display, while the main portion of the display outputs the default view at a default viewing angle.

Thanks to the described aspects, by adjusting the field of view of a subset of the display by widening the viewing angle so that the object becomes visible for the driver in the subset of the display while the main portion of the display outputs the default view at a default viewing angle, it becomes possible for the driver to detect an object in a blind spot of the driver, while still being able to see the standard view along the side of the vehicle. Thereby the risk of drivers being disoriented is eliminated or at least reduced, while the driver's attention is directed to the object in the blind spot. It is thereby also easier for the driver to correctly estimate the distance between the own vehicle and the detected object. Also, a broader area may be covered and a situation where a plurality of objects is situated behind and/or at the side of the vehicle may be presented for the driver. Further, the presented solution may be realized without additional sensors, besides the sensors already provided on the vehicle for other purposes. Thereby the problems of blind spots around the vehicle may be eliminated or at least reduced without increased sensor costs. Thus increased traffic safety is achieved.

Other advantages and additional novel features will become apparent from the subsequent detailed description.

BRIEF DESCRIPTION OF THE DRAWINGS

Embodiments of the invention will now be described in further detail with reference to the accompanying figures, in which.

DETAILED DESCRIPTION OF THE INVENTION

Embodiments of the invention described herein are defined as a method and a control unit, which may be put into practice in the embodiments described below. These embodiments may, however, be exemplified and realized in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1:
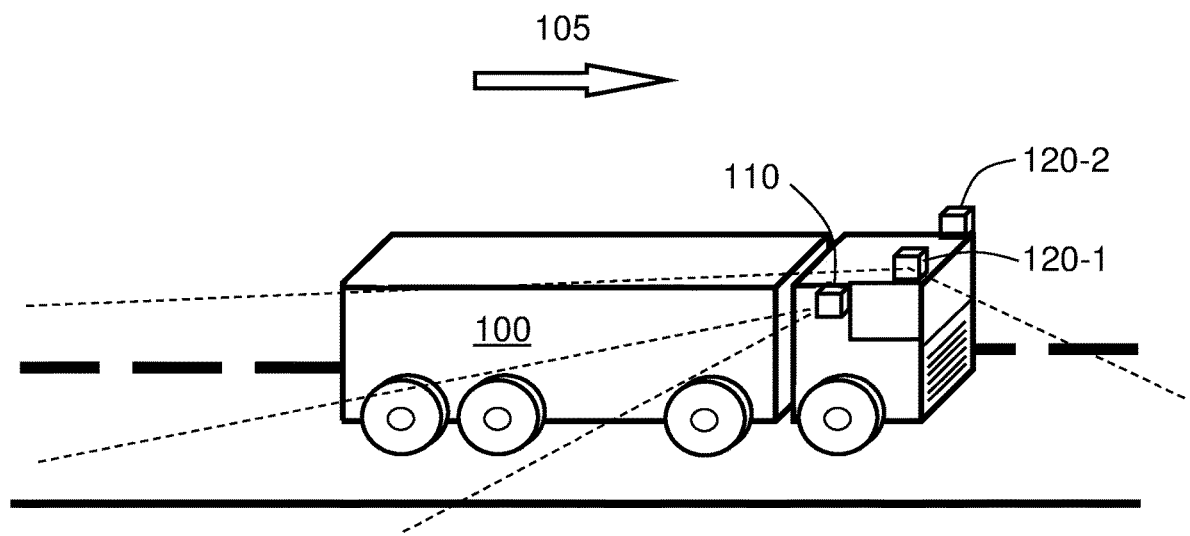
FIG. 1 illustrates a vehicle according to an embodiment of the invention.

FIG. 1 illustrates a scenario with a vehicle 100. The vehicle 100 is driving on a road in a driving direction 105.

The vehicle 100 may comprise e.g. a truck, a bus, a car or any similar vehicle or other means of conveyance.

The vehicle 100 may comprise a camera 110, directed to capture images at the back and the side of the vehicle 100. The camera 110 may comprise a video camera, or a camera configured for streaming images. The camera 110 is part of a digital rear view mirror, replacing the reverse mirror on the two respective sides of the vehicle 100, together with a connected control unit and a display, outputting images captured by the camera 110, possibly image processed by the control unit.

The vehicle 100 furthermore comprises a sensor 120-1, 120-2. The sensors 120-1, 120-2 may comprise e.g. a camera, a stereo camera, an infrared camera, a video camera, a radar, a lidar, an ultrasound device, a time-of-flight camera, or similar device, in different embodiments. The sensors 120-1, 120-2 may be directed to a left and a right side of the vehicle 100, respectively, as regarded in the driving direction 105 of the vehicle 100. Thereby, the sensors 120-1, 120-2 may detect any objects appearing at the respective side of the vehicle 100. The sensor 120-1, 120-2 may in some embodiments also determine a distance to the object, a direction to the object, a movement direction of the object and/or a velocity of the object, in different embodiments.

In some embodiments, the sensors 120-1, 120-2 may be mounted in the cabin behind the windshield in some embodiments, which has some advantages compared to externally mounted sensor systems. These advantages include protection from dirt, snow, rain and to some extent also from damage, vandalism and/or theft. Such sensor 120-1, 120-2 may also be used for a variety of other tasks.

Thereby, the side view sensor 120-1, 120-2 may identify e.g. if another vehicle is on its way to disappear into a blind spot of the driver, around the vehicle 100.

Instead of using traditional rear view mirrors on the vehicle 100, the camera 110, upon capturing an image or a stream of images, may output it/them on a display intended to display objects outside a driver's direct field of vision. Such display may comprise e.g. a display in the cabin of the vehicle 100, a projector, a Head-Up Display, a transparent display being part of the windshield, intelligent glasses of the driver, etc., which output an image, or stream of images, captured by a corresponding camera 110. Typically, the camera on the left side of the vehicle 100 may be associated with a presentational device on the left side of the cabin while the camera 110 on the right side of the vehicle 100 may be associated with a presentational device on the right side of the cabin, even if other combinations are possible.

By using the environmental sensors 120-1, 120-2 such as cameras, radars, lidars, ultrasonics etc., with object detection and tracking capabilities it is possible to automatically adjust the field of view of the displays so that the driver is able to keep track of nearby objects in the digital rear view mirrors.

The adjustment of the field of view of a subset of the display by widening the viewing angle so that the object becomes visible for the driver in the subset of the display, while the main portion of the display outputs the default view at a default viewing angle.

The driver is thereby able to see relevant objects in the digital rear view mirrors which would otherwise be outside of the field of view of the driver. The field of view of the driver is optimized to the driving situation creating a relaxed and safe driving environment.

An advantage with the method is that the camera 110 (and thereby the view in the digital rear view mirror) is not redirected to follow the detected object. It is thereby avoided that the driver is disoriented and becomes uncertain of what is displayed in the digital rear view mirror. The driver is able to watch the rear part of the vehicle 100. By not widening the field of view of the camera 110/display, but instead keeping a normal viewing angle and instead follow the detected and identified object, the main part of the outputted image is not distorted. It is thereby easy for the driver to estimate the distance to the object, unlike the case when the field of view is widened over all the display.

Further, in some embodiments, a detected object around the vehicle 100 may be indicated on an overview presentation, e.g. on a display in the cabin, or in any alternative presentational device.

Traffic safety is thereby enhanced.

Figure 2A:
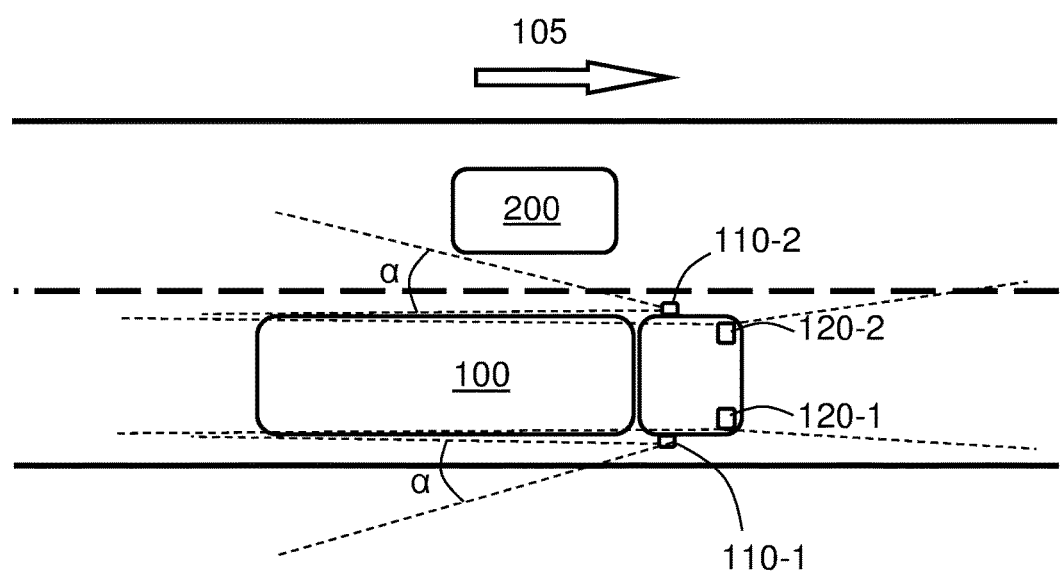
FIG. 2A illustrates a vehicle according to an embodiment, as regarded from above.

FIG. 2A schematically illustrates a scenario, similar to the previously discussed scenario illustrated in FIG. 1, but with the vehicle 100 seen from an above perspective and wherein an over taking object 200 is depicted.

The object 200 may be a vehicle, a human, an animal, a lamp post or e.g. any imaginable static or dynamic item.

When the vehicle 100 is driving in the driving direction 105, the side directed sensor 120-2 may detect the object 200 in this illustrated scenario, also when it cannot be regarded neither by direct sight of the driver, nor by the field of view α, captured by the camera 110-2. The object 200 is thus situated in the previously discussed blind spot of the driver and a dangerous traffic situation may emerge in case the driver is not aware of the object 200 and decides to change driving lanes.

Figure 2B:
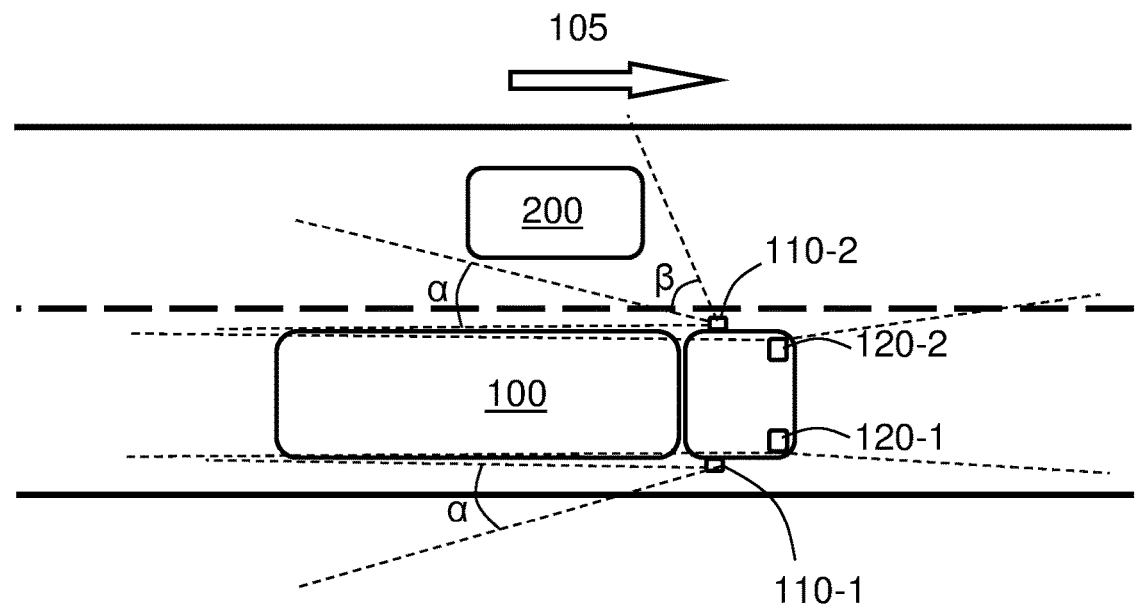
FIG. 2B illustrates a vehicle according to an embodiment, as regarded from above.

FIG. 2B schematically illustrates a scenario following the scenario illustrated in FIG. 2A in some embodiments.

The object 200 is captured within an extended field of view β of the camera 110-2 and outputted at a subset of the left side display.

The driver is thereby enabled to detect the object 200 without redirection of the camera 110-2, as the normal field of view α of the camera 110-2 is outputted on a main section of the display while a subset of the display outputs the extended field of view β of the camera 110-2.

Figure 2C:
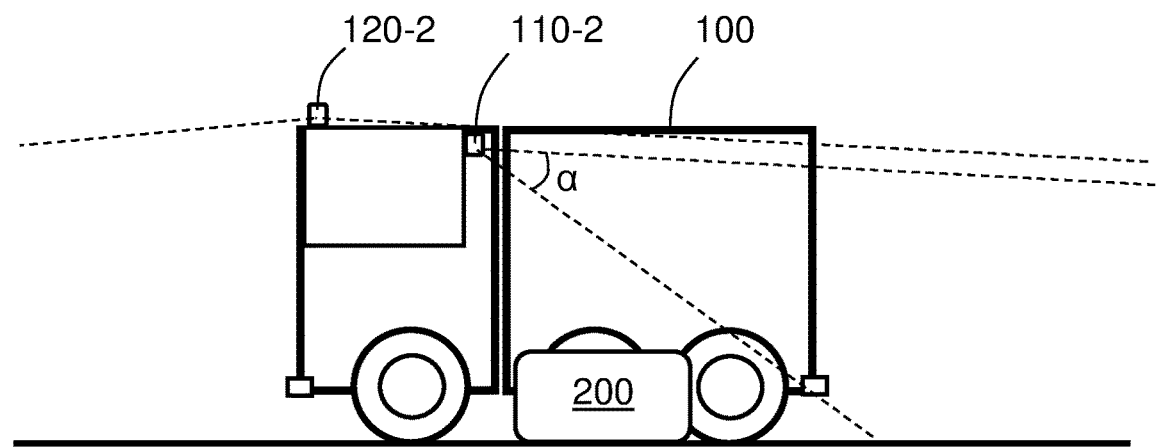
FIG. 2C illustrates a side view of a vehicle according to an embodiment.

FIG. 2C schematically illustrates a scenario, similar to the previously discussed scenario illustrated in FIG. 1, but with the vehicle 100 seen from an above perspective and wherein an over taking (rather low) object 200 is depicted.

The camera 110-2 is not able to capture the object 200 within the normal field of view α. However, the object 200 is detected by the sensor 120-2.

The object 200 is at this moment thus situated in a blind spot of the driver, which per se is not dangerous but a dangerous situation may emerge in case the driver of the vehicle 100 decides to change lanes.

Figure 2D:
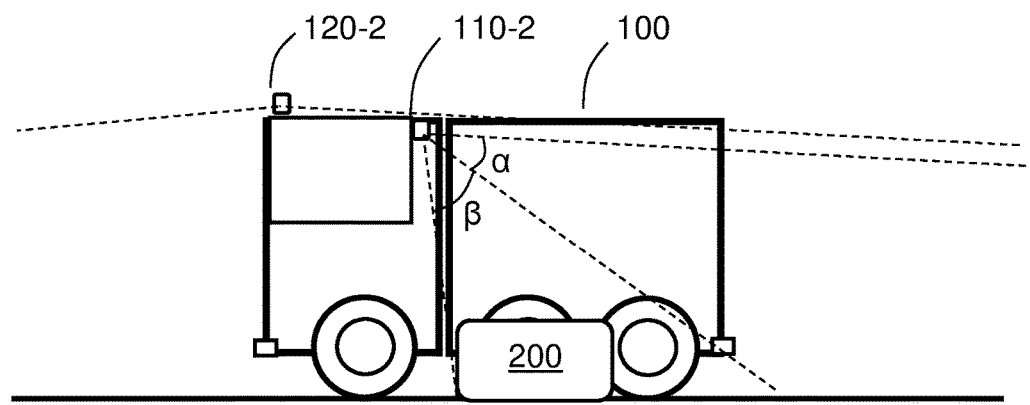
FIG. 2D illustrates a side view of a vehicle according to an embodiment.

FIG. 2D schematically illustrates a scenario following the scenario illustrated in FIG. 2C in some embodiments.

The object 200 is captured within an extended field of view β of the camera 110-2 and outputted at a subset of the left side display.

The driver is thereby enabled to detect the object 200 without redirection of the camera 110-2, as the normal field of view α of the camera 110-2 is outputted on a main section of the display while a subset of the display outputs the extended field of view β of the camera 110-2.

Thereby, the driver becomes aware of the object 200 at the left side of the own vehicle 100 and is enabled to continue the driving with that vehicle in mind. By maintaining the same viewing angle of the camera 110-2 and the presentational device, distance estimation of the object 200 in relation to the own vehicle 100 is facilitated for the driver.

It may be noted that the vehicle 100 may have additional sensors in some embodiments, which may be of the same or different types.

Further, in some embodiments, the field of view α, β of the camera 110-2/display may return to the normal field of view α in some embodiments, e.g. when the detected object 200 no longer is situated at the side of the vehicle 100 and/or when another object enters the zone at the left side of the vehicle 100.

Figure 3:
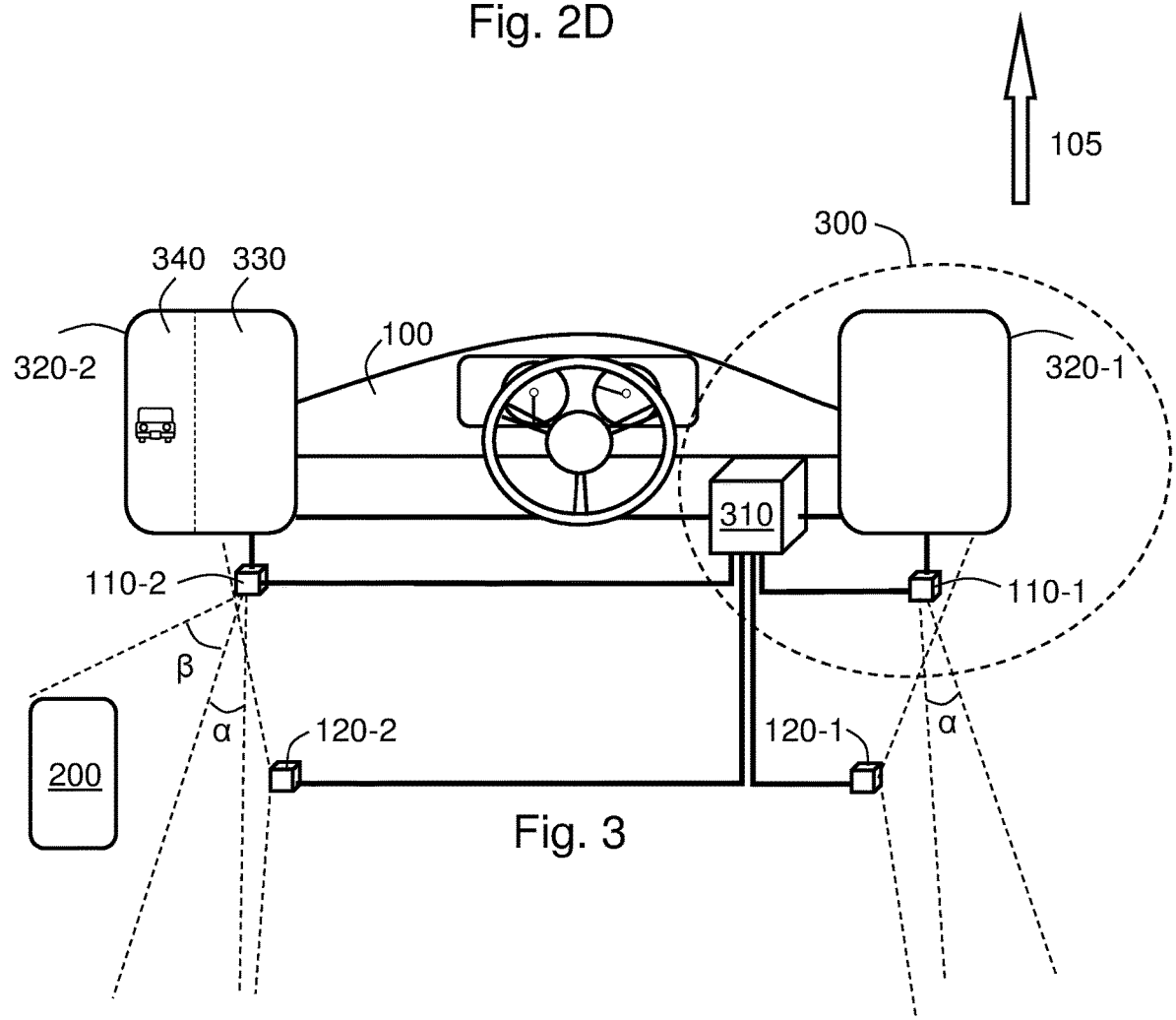
FIG. 3 illustrates an example of a vehicle interior according to an embodiment.

FIG. 3 illustrates an example of a vehicle interior of the vehicle 100 and depicts how the previously scenario in FIG. 1 and/or FIG. 2A-2D may be perceived by the driver of the vehicle 100.

The vehicle 100 comprises a control unit 310, a right side display 320-1 intended to display objects 200 outside a driver's direct field of vision, situated on the right side of the vehicle 100, and a left side display 320-2 intended to display objects 200 outside a driver's direct field of vision, situated on the left side of the vehicle 100. Each such display 320-1, 320-2 is associated with a respective camera 110-1, 110-2, situated on the corresponding side of the vehicle 100. The cameras 110-1, 110-2 may typically comprise a respective video camera.

Thus the vehicle comprises digital rear view mirrors 300, which comprises one display 320-1, 320-2, one camera 110-1, 110-2 and the control unit 310.

The display 320-1, 320-2 may in some alternative embodiments be complemented or replaced by another presentational device such as e.g. a display, a loudspeaker, a projector, a head-up display, a display integrated in the windshield of the vehicle 100, a display integrated in the dashboard of the vehicle 100, a tactile device, a portable device of the vehicle driver/owner, intelligent glasses of the vehicle driver/owner, etc.; or a combination thereof.

However, in some embodiments, the vehicle 100 may comprise a plurality of sensors 120-1, 120-2 on each side of the vehicle 100 for detecting objects 200. The sensors 120-1, 120-2 may be of the same, or different types, such as e.g. a camera, a stereo camera, an infrared camera, a video camera, a radar, a lidar, an ultrasound device, a time-of-flight camera, or similar device in different embodiments.

The sensors 120-1, 120-2 and the cameras 110-1, 110-2 may be the same devices in some alternative embodiments.

The displays 320-1, 320-2 each has a respective main portion 330, wherein a normal field of view α of the respective camera 110-1, 110-2 may be outputted; and a subset 340, where the extended field of view β of the respective camera 110-1, 110-2 may be displayed, in case an object 200 is detected. The extended field of view β thus capture a wider view of the environmental reality than the normal field of view α or default view α. However, when no object 200 is detected situated outside the default view α, the default view α of the respective camera 110-1, 110-2 may be outputted at both the main portion 330 and the subset 340 of the displays 320-1, 320-2. Thus, when it is determined that no object 200 is detected situated outside the default view α, the field of view of the subset 340 of the display 320-1, 320-2 may be adjusted to the default view α at the default viewing angle.

The control unit 310 is able to detect the object 200, situated out of the normal field of view α, e.g. based on signals received from the sensor 120-1, 120-2. Upon such detection, the extended field of view β may be displayed in the subset 340 of the display 320-1, 320-2.

As the object 200 moves in relation to the vehicle 100, the extended field of view β may be adjusted, in some embodiments.

In some embodiments, when the object 200 is detected in the blind spot of the driver, the driver's attention may be caught, besides tracking the object 200 with said devices 320-1, 320-2/cameras 110-1, 110-2, by an audio signal, light signal, haptic signal etc.

Thereby the risk of an accident due to an object 200 appearing in a blind spot of the driver is reduced, as the driver is made aware of the object 200 and its position in relation to the own vehicle 100.

The control unit 310 may communicate with the sensors 120-1, 120-2, cameras 110-1, 110-2 and displays 320-1, 320-2 e.g. via a wired or wireless communication bus of the vehicle 100, or via a wired or wireless connection. The communication bus may comprise e.g. a Controller Area Network (CAN) bus, a Media Oriented Systems Transport (MOST) bus, or similar. However, the communication may alternatively be made over a wireless connection comprising, or at least be inspired by any of the previously discussed wireless communication technologies.

Figure 4:
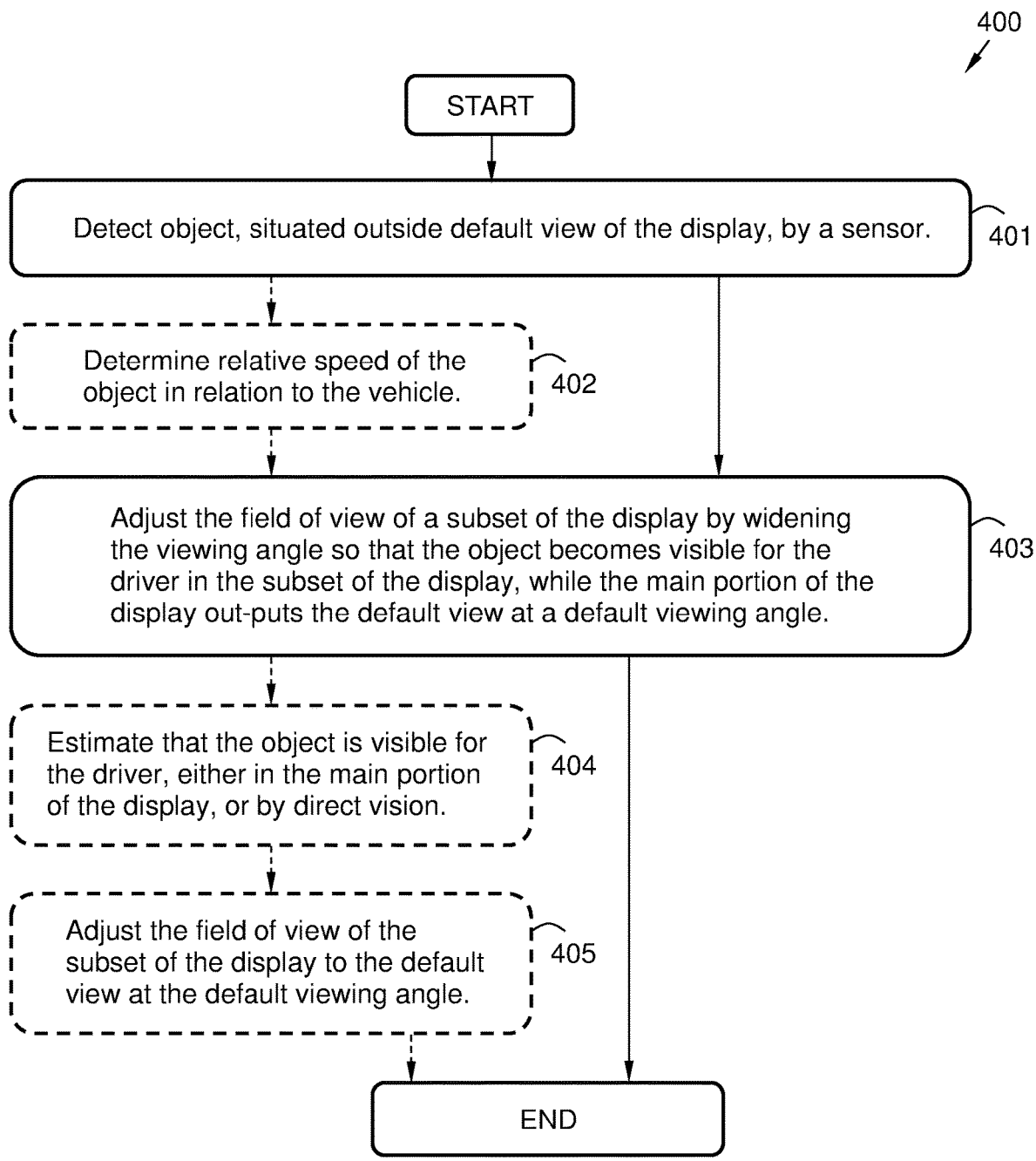
FIG. 4 is a flow chart illustrating an embodiment of the method.

FIG. 4 illustrates an example of a method 400 according to an embodiment. The flow chart in FIG. 4 shows the method 400 for use in a vehicle 100 comprising a digital rear view mirror 300. The method 400 aims at detecting an object 200 situated outside a default view α of a display 320-1, 320-2 of the digital rear view mirror 300 and visualizing the detected object 200 for a driver of the vehicle 100.

The vehicle 100 may be e.g. a truck, a bus, a car, or similar means of conveyance.

The vehicle 100 may comprise a plurality of sensors 120-1, 120-2 pointable towards the object 200, in some embodiments, simultaneously, shifted or sequentially in time.

In order to correctly be able to detect and visualize the object 200, the method 400 may comprise a number of steps 401-405. However, some of these steps 401-405 may be performed in various alternative manners. Some method steps may only be performed in some optional embodiments; such as e.g. steps 402. Further, the described steps 401-405 may be performed in a somewhat different chronological order than the numbering suggests. The method 400 may comprise the subsequent steps:

Step 401 comprises detecting the object 200, situated outside the default view α of the display 320-1, 320-2, intended to display objects 200 outside a driver's direct field of vision, by a sensor 120-1, 120-2.

In some embodiments, the location of the detected object 200 in relation to the vehicle 100 may be determined.

Further, in some particular embodiments, the detection of the object 200 may also comprise identifying the object 200 by image recognition.

Image recognition/computer vision is a technical field comprising methods for acquiring, processing, analysing, and understanding images and, in general, high-dimensional data from the real world in order to produce numerical or symbolic information. A theme in the development of this field has been to duplicate the abilities of human vision by electronically perceiving and understanding an image. Understanding in this context means the transformation of visual images (the input of retina) into descriptions of the world that can interface with other thought processes and elicit appropriate action. This image understanding can be seen as the disentangling of symbolic information from image data using models constructed with the aid of geometry, physics, statistics, and learning theory. Computer vision may also be described as the enterprise of automating and integrating a wide range of processes and representations for vision perception.

The image data of the cameras 110-1, 110-2 and/or sensors 120-1, 120-2 may take many forms, such as e.g. images, video sequences, views from multiple cameras, or multi-dimensional data from a scanner.

Computer vision may comprise e.g. scene reconstruction, event detection, video tracking, object recognition, object pose estimation, learning, indexing, motion estimation, and image restoration, just to mention some examples.

Step 402, which only may be comprised in some embodiments, comprises determining the relative speed of the object 200 in relation to the vehicle 100, based on signals received from the sensor 120-1, 120-2.

Step 403 comprises adjusting the field of view of a subset 340 of the display 320-1, 320-2 by widening the viewing angle so that the object 200 becomes visible for the driver in the subset 340 of the display 320-1, 320-2, while the main portion 330 of the display 320-1, 320-2 outputs the default view α at a default viewing angle.

The adjustment of the field of view of the subset 340 of the display 320-1, 320-2 may in some embodiments be made at a pace corresponding to the determined relative speed between the vehicle 100 and the object 200. An advantage therewith is that the driver gets an intuitive feeling of the relative speed of the object 200.

Step 404 which only may be performed in some particular embodiments, comprises estimating that the object 200 is visible for the driver, either in the main portion 330 of the display 320-1, 320-2, or by direct vision of the driver.

Step 405 which only may be performed in some particular embodiments, comprises adjusting the field of view of the subset 340 of the display 320-1, 320-2 to the default view α at the default viewing angle.

The adjustment of the field of view of the subset 340 of the display 320-1, 320-2 may in some embodiments be made at a pace corresponding to the determined relative speed.

Thereby, the default field of view α is again outputted on the whole area of the display 320-1, 320-2.

Figure 5:
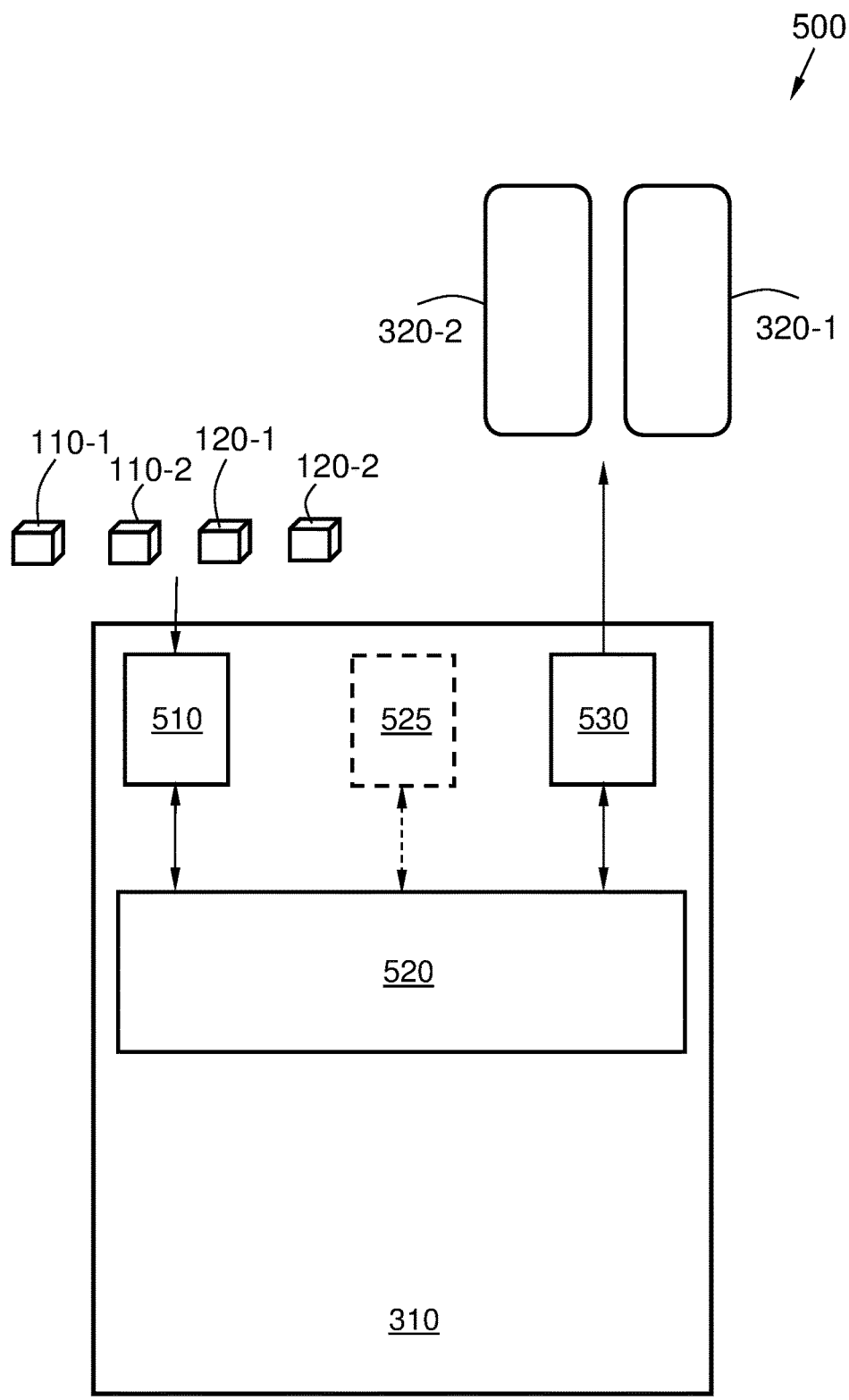
FIG. 5 is an illustration depicting a system according to an embodiment.

FIG. 5 illustrates an embodiment of a system 500 in a vehicle 100 comprising a digital rear view mirror 300, for detecting an object 200 situated outside a default view α of a display 320-1, 320-2 of the digital rear view mirror 300 and visualizing the detected object 200 for a driver of the vehicle 100.

The system 500 may perform at least some of the previously described steps 401-405 according to the method 400 described above and illustrated in FIG. 4.

The system 500 comprises at least one control unit 310 in the vehicle 100. The control unit 310 is configured to detect the object 200, situated outside a default view of a display 320-1, 320-2, intended to display objects 200 outside a driver's direct field of vision, based on signals received from a sensor 120-1, 120-2. Further, the control unit 310 is configured to generate control signals to adjust the field of view of a subset 340 of the display 320-1, 320-2 by widening the viewing angle so that the object 200 becomes visible for the driver in the subset 340 of the display 320-1, 320-2, while the main portion 330 of the display 320-1, 320-2 outputs the default view α at a default viewing angle.

Further, the control unit 310 may be configured to estimate that the object 200 is visible for the driver, either in the main portion 330 of the display 320-1, 320-2, or by direct vision. In some embodiments, the control unit 310 may be furthermore configured to generate control signals to adjust the field of view of the subset 340 of the display 320-1, 320-2 to the default view α at the default viewing angle.

The control unit 310 may in addition be further configured to determine the relative speed of the object 200 in relation to the vehicle 100. The control unit 310 may also be further configured to generate the control signals to adjust the field of view of the subset 340 of the display 320-1, 320-2 at a pace corresponding to the determined relative speed.

Further, in some embodiments, the control unit 310 may be configured to widen the field of view of the subset 340 of the display 320-1, 320-2 with a uniformly distributed viewing angle over the subset 340.

In some other alternative embodiments, the control unit 310 may be configured to widen the field of view of the subset 340 of the display 320-1, 320-2 with an increasing viewing angle towards the outer edge of the subset 340 of the display 320-1, 320-2, situated most remotely from the main portion 330 of the display 320-1, 320-2.

Further the control unit 310 may be configured to determine the location of the detected object 200 in relation to the vehicle 100, based on received sensor signals. In addition, the control unit 310 may be configured to generate control signals for outputting information indicating the determined location of the detected object 200 for the driver, in some embodiments.

The control unit 310 comprises a receiving circuit 510 configured for receiving a signal from the cameras 110-1, 110-2 and the sensors 120-1, 120-2.

Further, the control unit 310 comprises a processor 520 configured for performing at least some steps of the method 400, according to some embodiments.

Such processor 520 may comprise one or more instances of a processing circuit, i.e. a Central Processing Unit (CPU), a processing unit, a processing circuit, an Application Specific Integrated Circuit (ASIC), a microprocessor, or other processing logic that may interpret and execute instructions.

The herein utilised expression "processor" may thus represent a processing circuitry comprising a plurality of processing circuits, such as, e.g., any, some or all of the ones enumerated above.

Furthermore, the control unit 310 may comprise a memory 525 in some embodiments. The optional memory 525 may comprise a physical device utilised to store data or programs, i.e., sequences of instructions, on a temporary or permanent basis. According to some embodiments, the memory 525 may comprise integrated circuits comprising silicon-based transistors. The memory 525 may comprise e.g. a memory card, a flash memory, a USB memory, a hard disc, or another similar volatile or non-volatile storage unit for storing data such as e.g. ROM (Read-Only Memory), PROM (Programmable Read-Only Memory), EPROM (Erasable PROM), EEPROM (Electrically Erasable PROM), etc. in different embodiments.

Further, the control unit 310 may comprise a signal transmitter 530 in some embodiments. The signal transmitter 530 may be configured for transmitting a signal to e.g. the display 320-1, 320-2, and/or a warning system or warning device, for example.

In addition, the system 500 also comprises at least one sensor 120-1, 120-2 of the vehicle 100, for detecting the object 200 situated outside a default view α of a display 320-1, 320-2, intended to display objects outside a driver's direct field of vision. The at least one sensor 120-1, 120-2 may comprise e.g. a camera, a stereo camera, an infrared camera, a video camera, radar, lidar, ultrasonic sensor, time-of-flight camera, or thermal camera or similar. The at least one sensor 120-1, 120-2 utilised for performing at least a part of the method 400 may in some embodiments have another main purpose than performing the method 400, i.e. be already existing in the vehicle 100.

Further the system 500 also comprises at least one a digital rear view mirror 300, comprising a camera 110-1, 110-2 for capturing a stream of images and a display 320-1, 320-2 for displaying the captured stream of images of the corresponding camera 110-1, 110-2. The display 320-1, 320-2 comprises a main portion 330 which always output a default view α at a default viewing angle, and a subset of the display 320-1, 320-2, configured to alternately output the default view α at a default viewing angle and a widened viewing angle.

The above described steps 401-405 to be performed in the vehicle 100 may be implemented through the one or more processors 520 within the control unit 310, together with computer program product for performing at least some of the functions of the steps 401-405. Thus a computer program product, comprising instructions for performing the steps 401-405 in the control unit 310 may perform the method 400 comprising at least some of the steps 401-405 for detecting the object 200 and visualizing the detected object 200 for a driver of the vehicle 100, when the computer program is loaded into the one or more processors 520 of the control unit 310.

Further, some embodiments of the invention may comprise a vehicle 100, comprising the control unit 310, for detecting and visualizing the object 200, according to at least some of the steps 401-405.

The computer program product mentioned above may be provided for instance in the form of a data carrier carrying computer program code for performing at least some of the steps 401-405 according to some embodiments when being loaded into the one or more processors 520 of the control unit 310. The data carrier may be, e.g., a hard disk, a CD ROM disc, a memory stick, an optical storage device, a magnetic storage device or any other appropriate medium such as a disk or tape that may hold machine readable data in a non-transitory manner. The computer program product may furthermore be provided as computer program code on a server and downloaded to the control unit 310 remotely, e.g., over an Internet or an intranet connection.

The terminology used in the description of the embodiments as illustrated in the accompanying drawings is not intended to be limiting of the described method 400; the control unit 310; the computer program; the system 500 and/or the vehicle 100. Various changes, substitutions and/or alterations may be made, without departing from invention embodiments as defined by the appended claims.

As used herein, the term "and/or" comprises any and all combinations of one or more of the associated listed items. The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms such as via Internet or other wired or wireless communication system.

The invention claimed is:

1. A method in a vehicle comprising a digital rear view mirror configured for mounting on either a left or a right side of the vehicle to provide a rear view of objects located on the left or right side of the vehicle, wherein the digital rear view mirror comprises a camera for capturing a stream of images and a display for displaying the captured stream of images, wherein said digital rear view mirror is connected to a sensor arranged for detecting an object situated in an extended field of view outside a default field of view of said display of the digital rear view mirror and displaying the detected object on the display for a driver of the vehicle, wherein the method comprises:
   outputting on a main portion of the display the default view at a default viewing angle;
   detecting the object situated outside the default view of the display, by the sensor;
   changing a display on a subset of the display to an extended field of view having a view angle that is wider than the default viewing angle so that said extended field of view is displayed in the subset of the display, while the main portion of the display continues to display the default view at the default viewing angle;
   determining the relative speed of the object in relation to the vehicle, wherein changing of the field of view of the subset of the display is made at a pace corresponding to the determined relative speed;
   determining that the object is no longer detected; and
   when the object is no longer, changing the display on the subset of the display from displaying the extended field of view to displaying the default view at the default viewing angle, such that both the main portion and the subset portion both display the default field of view at the default viewing angle when no object is detected.

2. A control unit in a vehicle comprising a digital rear view mirror configured for mounting on either a left or a right side of the vehicle to provide a rear view of objects located on the left or right side of the vehicle, wherein the digital rear view mirror comprises a camera for capturing a stream of images and a display for displaying the captured stream of images, wherein said digital rear view mirror is connected to a sensor arranged for detecting an object situated in an extended field of view outside a default field of view of a display of the digital rear view mirror and displaying the detected object on the display for a driver of the vehicle, wherein the control unit is configured to:
   output on a main portion of the display the default view at a default viewing angle;
   detect the object situated outside a default view of the display, based on signals received from the sensor;
   generate control signals to change a display on a subset of the display to an extended field of view having a view angle that is wider than the default viewing angle so that said extended field of view is displayed in the subset of the display, while the main portion of the display continues to display the default view at the default viewing angle;
   determine the relative speed of the object in relation to the vehicle;
   generate the control signals to change the field of view of the subset of the display at a pace corresponding to the determined relative speed;
   determine that the object is no longer detected; and
   when the object is no longer, change the display on the subset of the display from displaying the extended field of view to displaying the default view at the default viewing angle, such that both the main portion and the subset portion both display the default field of view at the default viewing angle when no object is detected.

3. A computer program product stored on a non-transitory computer-readable medium, said computer program product for use with a digital review view mirror configured for mounting on either a left or a right side of a vehicle to provide a rear view of objects located on the left or right side of the vehicle, wherein the digital rear view mirror comprises a sensor for capturing a stream of images and a display for displaying the captured stream of images, wherein the sensor is arranged for detecting an object situated in an extended field of view outside a default field of view of said display of the digital rear view mirror and the display is configured for displaying the detected object for a driver of the vehicle, said computer program product comprising computer instructions to cause one or more electronic control units or computers to perform the following operations:
   outputting on a main portion of the display the default view at a default viewing angle;
   detecting the object situated outside the default view of the display, by the sensor;
   changing a display on a subset of the display to an extended field of view having a view angle that is wider than the default viewing angle so that said extended field of view is displayed in the subset of the display, while the main portion of the display continues to display the default view at the default viewing angle;

determining the relative speed of the object in relation to the vehicle, wherein changing of the field of view of the subset of the display is made at a pace corresponding to the determined relative speed;

determining that the object is no longer detected; and when the object is no longer, changing the display on the subset of the display from displaying the extended field of view to displaying the default view at the default viewing angle, such that both the main portion and the subset portion both display the default field of view at the default viewing angle when no object is detected.

4. A system in a vehicle for detecting an object situated outside a default view of a display of the digital rear view mirror and displaying the detected object for a driver of the vehicle, which system comprises:

a digital rear view mirror configured for mounting on either a left or a right side of the vehicle to provide a rear view of objects located on the left or right side of the vehicle, wherein the digital rear view mirror comprises a camera for capturing a stream of images and a display for displaying the captured stream of images, wherein the display comprises a main portion which always displays a default field of view at a default viewing angle, and a subset of the display, configured to alternately output the default field of view at the default viewing angle and an extended field of view having a view angle that is wider than the default viewing angle;

at least one sensor of the vehicle configured for detecting the object situated outside the default field of view of the display; and a control unit configured to:

output on a main portion of the display the default view at a default viewing angle;

detect the object situated outside a default view of the display, based on signals received from the at least one sensor;

generate control signals to change a display on a subset of the display to an extended field of view having a view angle that is wider than the default viewing angle so that said extended field of view is displayed in the subset of the display, while the main portion of the display continues to display the default view at the default viewing angle;

determine the relative speed of the object in relation to the vehicle;

generate the control signals to change the field of view of the subset of the display at a pace corresponding to the determined relative speed;

determine that the object is no longer detected; and when the object is no longer, changing the display on the subset of the display from displaying the extended field of view to displaying the default view at the default viewing angle, such that both the main portion and the subset portion both display the default field of view at the default viewing angle when no object is detected.

* * * * *